US008902875B2

(12) United States Patent
Tujkovic et al.

(10) Patent No.: US 8,902,875 B2
(45) Date of Patent: Dec. 2, 2014

(54) SUBCARRIER ALLOCATION IN OFDMA WITH IMPERFECT CHANNEL STATE INFORMATION AT THE TRANSMITTER

(75) Inventors: Djordje Tujkovic, Santa Clara, CA (US); Arogyaswami Paulraj, Santa Clara, CA (US)

(73) Assignee: Broadcom Corporation, Irvine, CA (US)

( * ) Notice: Subject to any disclaimer, the term of this patent is extended or adjusted under 35 U.S.C. 154(b) by 1182 days.

(21) Appl. No.: 11/454,354

(22) Filed: Jun. 16, 2006

(65) Prior Publication Data

US 2007/0110003 A1 May 17, 2007

Related U.S. Application Data

(60) Provisional application No. 60/711,956, filed on Aug. 25, 2005.

(51) Int. Cl.
| | | |
|---|---|---|
| H04B 7/208 | (2006.01) | |
| H04L 5/02 | (2006.01) | |
| H04B 7/12 | (2006.01) | |
| H04B 7/04 | (2006.01) | |
| H04B 7/06 | (2006.01) | |
| H04W 72/08 | (2009.01) | |

(52) U.S. Cl.
CPC *H04B 7/12* (2013.01); *H04L 5/023* (2013.01); *H04B 7/06* (2013.01); *H04W 72/08* (2013.01); *H04B 7/0452* (2013.01)
USPC ........... 370/344; 370/310; 370/343; 455/403; 455/422.1; 455/450; 455/451; 455/452.1; 455/452.2; 455/453

(58) Field of Classification Search
USPC ............... 370/310, 343–344; 455/403, 422.1, 455/450–451, 452.1–452.2, 453
See application file for complete search history.

(56) References Cited

U.S. PATENT DOCUMENTS

| | | | |
|---|---|---|---|
| 6,662,024 B2 | 12/2003 | Walton et al. | |
| 6,760,388 B2 | 7/2004 | Ketchum et al. | |
| 6,771,706 B2 | 8/2004 | Ling et al. | |
| 6,801,580 B2 | 10/2004 | Kadous | |
| 2003/0128658 A1* | 7/2003 | Walton et al. .................. | 370/208 |
| 2003/0214917 A1* | 11/2003 | Molisch et al. ............... | 370/286 |
| 2005/0179607 A1* | 8/2005 | Gorsuch et al. ............... | 343/754 |
| 2005/0233700 A1* | 10/2005 | Pecen et al. .................. | 455/67.11 |
| 2006/0135080 A1* | 6/2006 | Khandekar et al. ............. | 455/69 |
| 2006/0285577 A1* | 12/2006 | Santhoff et al. ............... | 375/130 |

OTHER PUBLICATIONS

Sternad et al., Adaptive OFDMA/TDMA Transmission at Vehicular Velocities, Proceedings Wireless World Research Forum WWRF12, Toronto, Canada, Nov. 2004.

(Continued)

*Primary Examiner* — Ajit Patel
*Assistant Examiner* — Matthew Genack
(74) *Attorney, Agent, or Firm* — Sterne, Kessler, Goldstein & Fox P.L.L.C.

(57) ABSTRACT

A system and method for digital communications combine features of multiuser diversity and frequency diversity allocation schemes. The system and method retain advantages of multiuser allocation whenever possible by assigning a fraction, α, of the available bandwidth to users in channels where the users are experiencing high SNR. Recognizing that channel state information at the transmitter is not perfect, however, the system and method allocate the remaining bandwidth, 1−α, pseudorandomly according to frequency diversity.

19 Claims, 6 Drawing Sheets

(56) References Cited

OTHER PUBLICATIONS

Onggosanusi et al., Efficient Signaling Schemes for Wideband Space-Time Wireless Channels Using Channel State Information, Jan. 2003, IEEE Transactions.

Wang et al., Impact of Multiuser Diversity and Channel Variability on Adaptive OFDM, Proc. IEEE Vehicular Technology Conference Fall, Orlando, Florida, USA, Oct. 2003.

Toufik et al., Multiuser Channel Allocation Algorithms Achieving Hard Fairness, 47th annual IEEE Global Telecommunications Conference, Nov. 29-Dec. 3, 2004, Dallas, TX.

WIMAX Forum, WIMAX: A Technical Overview and Relationship to 3G Cellular Systems, Rev 3.1, Feb. 1, 2006.

Form PCT/ISA/220, "PCT Notification of Transmittal of the International Search Report and the Written Opinion of the International Searching Authority, or the Declaration," 1 pg, Sep. 12, 2007.

Form PCT/ISA/210, "PCT International Search Report," 2 pgs, Sep. 12, 2007.

Form PCT/ISA/237, "PCT Written Opinion of the International Searching Authority," 3 pgs, Sep. 12, 2007.

\* cited by examiner

SUBCARRIER ALLOCATION IN OFDMA WITH IMPERFECT CHANNEL STATE INFORMATION AT THE TRANSMITTER

RELATED APPLICATIONS

This application claims priority benefit of U.S. provisional application Ser. No. 60/711,956 filed on Aug. 25, 2005 which is hereby incorporated by reference herein.

TECHNICAL FIELD

The invention relates generally to digital communications. In particular it relates to frequency allocation in orthogonal frequency-division multiple access (OFDMA) systems.

BACKGROUND

Wireless digital communications systems are poised to offer a cost-effective alternative to cable and DSL data services. So called "WiMAX" technology, based on the IEEE 802.16e air interface standard is a promising framework for broadband wireless applications. It has the potential to enable full internet and digital voice services for both fixed and mobile users.

The physical layer architecture for IEEE 802.16e OFDMA systems is based on orthogonal frequency-division multiplexing (OFDM) modulation. Since OFDM divides the total bandwidth into multiple narrowband sub-bands, the effects of frequency selective fading are reduced. The OFDM system allows for a simple receiver structure while maintaining high link quality. The technology also employs adaptive modulation and coding in both the downlink and the uplink to deal with variations in link quality. This enables WiMAX to offer multiple date rates at the physical layer which can be adapted dynamically based on the integrity of the air link.

Multiple users share the total system bandwidth by multiplexing their data in both time and frequency. In an adaptive OFDM system, spectral efficiency can be improved by allocating time-frequency resources based on throughput requirements, quality of service constraints and the channel qualities of each user. A scheduler, which optimizes resource allocation for multiple active users, becomes a key element in such a solution. In present code-division multiple access (CDMA) systems, spectral efficiency decreases with an increasing number of active users because of intra-cell interference due to imperfect orthogonality of the downlinks. In an adaptive OFDM system, where orthogonal time-frequency resources are given to the user who can utilize them best, the spectral efficiency instead increases with the number of active users. This effect is known as multiuser diversity.

To take greatest advantage of multiuser diversity, channel state information must be available at the transmitter. When perfect channel information exists, i.e. knowledge of the signal to interference and noise ratio (SINR), for every possible time-frequency bin, an optimal assignment of spectral resources can be accomplished. Of course, in reality channel state information is never perfectly known.

Conversely when poor or no channel information is available, the best allocation of spectral resources may be to distribute time-frequency bins to users randomly across the entire system bandwidth. This mode of operation is known as frequency diversity.

Particularly in the case of mobile users, where channel state information is not only imperfect, but also constantly changing, neither multiuser diversity nor frequency diversity represents an optimal solution. Multiuser diversity may not work well in a changing mobile communications environment where the quality of channel state information is variable. On the other hand, frequency diversity ignores channel state information that may be useful even though it is imperfect.

What is needed is a mode that combines the best features of multiuser diversity and frequency diversity modes. Such a solution would enable WiMAX and other OFDMA digital communications systems to achieve better net spectral efficiency.

BRIEF DESCRIPTION OF THE DRAWINGS

The drawings are heuristic for clarity.

DETAILED DESCRIPTION

In wireless digital communications information is transmitted between base stations and users via radio signals that, in modern systems, lie approximately in the gigahertz frequency range. The information can include digitized voice signals or any other type of digital information such as email or web page data. Prior to being sent over a radio link, digital data is mapped onto complex transmission symbols. Here, "complex", means containing real and imaginary parts, or both amplitude and phase components.

In an orthogonal frequency-division multiplexed (equivalently: orthogonal frequency-division multiple access, OFDMA) digital communications system, the range of frequencies over which symbols are transmitted, i.e. the total system bandwidth, is divided into many sub-bands which are further divided into bins. Individual symbols are sent by modulating tones within each bin. The amount of time over which tones are modulated to send a symbol is a single time slot. Several time slots make up a burst of symbols and multiple bursts form a frame.

As an example only, an OFDMA system might use a total system bandwidth of 10 MHz. 0.78 MHz on each side is reserved for so-called "guard bands" in which no transmission is allowed. The center 8.44 MHz is divided into 12 sub-bands, each of which is divided into 8 bins. Each bin is further divided into 9 tones. Therefore, in this example, there are a total of 864 tones available for time-frequency allocation. The cardinality of the set of complex symbols that are used to modulate each tone could be 2, 4, 8, 16 or 64 (corresponding to 1 to 6 bits of information). The symbol transmission time might be around 100 microseconds with a burst containing anywhere from 1 to about 50 symbols and a frame containing about 50 or more symbols. These example numbers are meant only to convey a sense of typical OFDMA parameters; actual systems may vary from this example.

In an OFDMA system the number of frequency bins available in a given period of time determines the maximum information carrying capacity of the system. If, at a given time, all tones in all bins are being modulated with symbols, then the maximum amount of information that can be transmitted is being transmitted. A time-frequency bin, i.e. a frequency bin for one symbol transmission time, is a convenient unit of data transmission capacity or resources available in the system.

In real world communications, problems, such as noise, fading, interference, and multiple users wanting to use a system at the same time, make it impossible to ensure that all symbols are sent with perfect fidelity. Error-correcting coding schemes are used to ensure that data is transmitted correctly even when some symbols fail to get through. However, the spectral efficiency of an OFDMA system can be improved by an adaptive scheme to allocate time-frequency resources.

Figure 1:
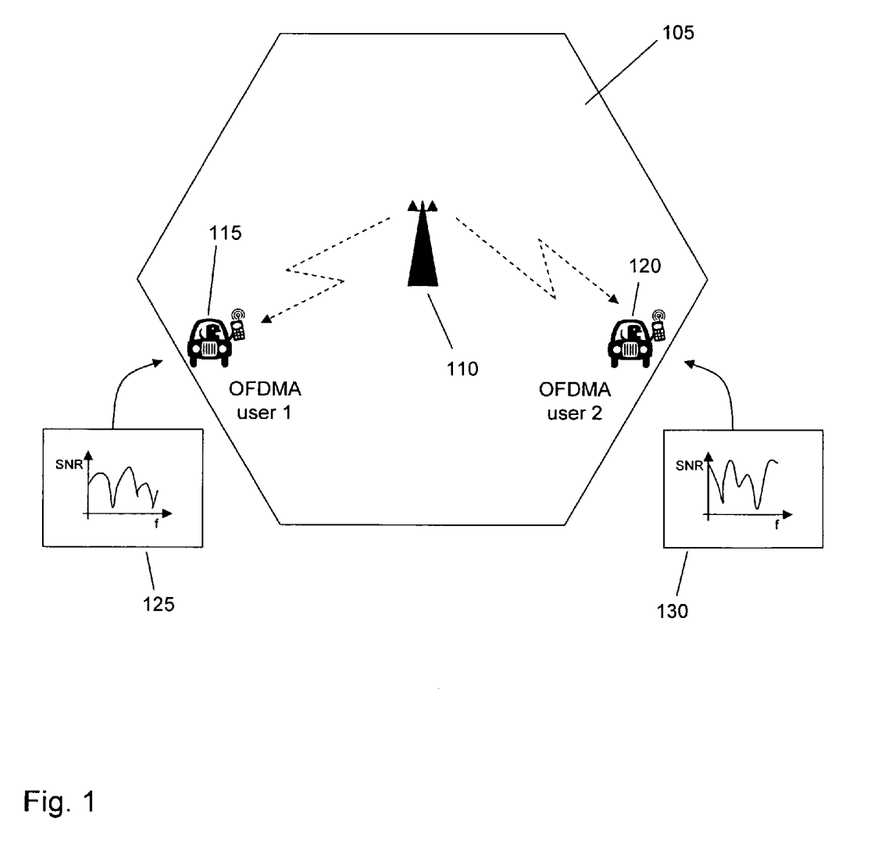
FIG. 1 shows a communications cell with two users experiencing different channel states.

FIG. 1 shows a communications cell with two users experiencing different channel states. In FIG. 1, communications cell 105 is served by base station 110. Base station 110 is in communication with two users, 115 and 120. Of course, in a real system many more than two users may be served by a single base station in a cell, but in FIG. 1 just two users are shown for simplicity. Users 115 and 120 each experience different signal-to-noise ratio (SNR) spectra as represented by graphs of SNR versus frequency 125 and 130. Each SNR versus frequency graph indicates that for each particular user certain frequencies provide better signal transmission quality than others. If transmitter 110 has the benefit of this channel state information it may use the information to allocate frequency bins to the users at places in the frequency spectrum where the SNR is high.

Dynamic resource allocation provides improvements in spectral efficiency by taking advantage of channel variations and user diversity. Channel state information is used to schedule users. The method for obtaining channel state information at the transmitter depends on the system architecture. For example in some systems receivers estimate channel state information based on their reception of a common pilot tone and feed the information back to the transmitter. In systems employing time-division duplexing, channel reciprocity allows the transmitter to use the channel state information estimated during reception for transmission. In practical time-division duplexing systems, amplitude information can be estimated from the opposite link, while it is more difficult to obtain accurate phase information due to difficulty in calibrating the difference in phase response between the transmitter and receiver chains.

When channel state information is available at the transmitter, multiuser diversity can be used as an allocation strategy for maximizing the total data rate of an OFDMA system. Multiuser diversity involves scheduling at any one time the user which can make the best use of the channel, i.e. the user with the best channel response. Multiuser diversity yields an increase in the total throughput as a function of the number of users.

Figure 2:
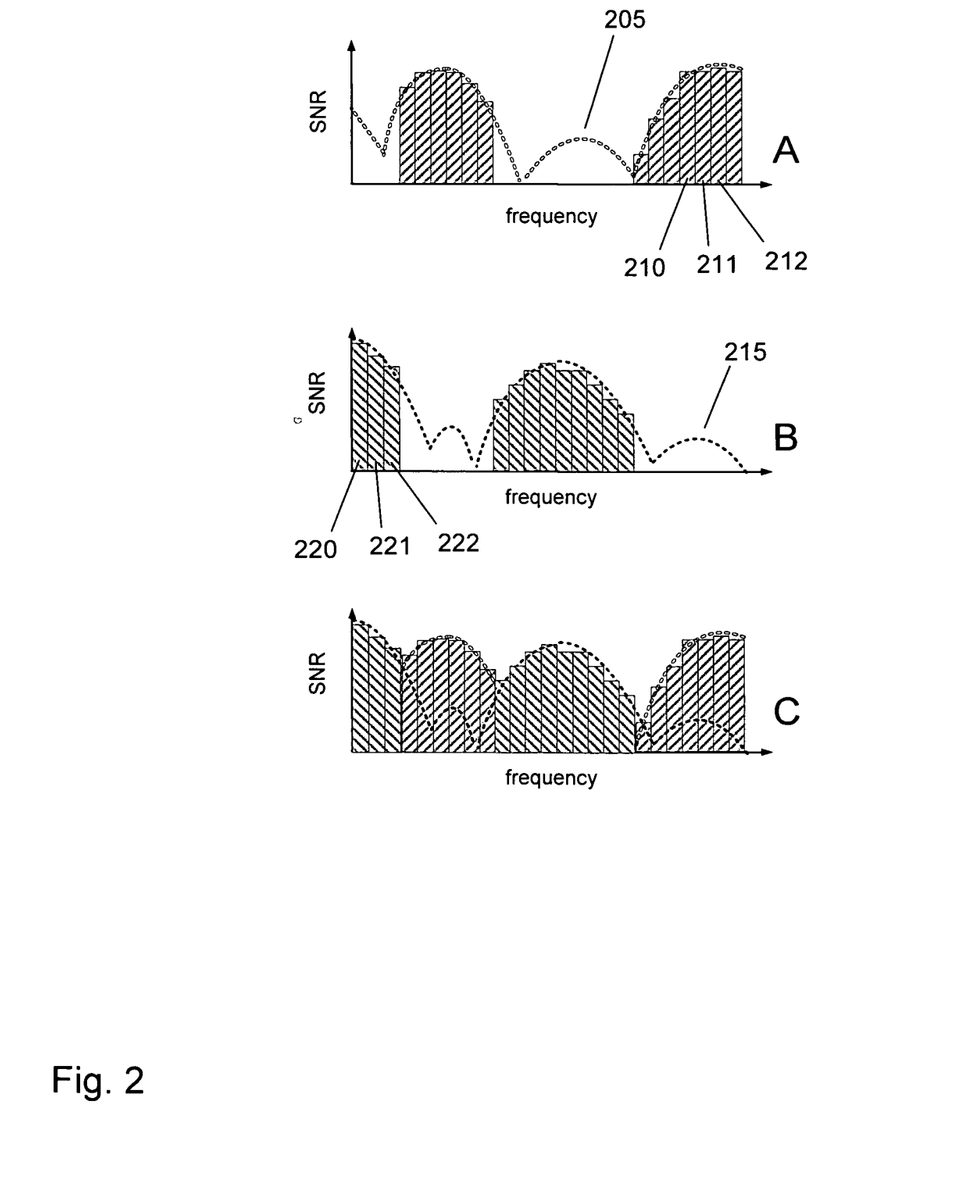
FIGS. 2A-2C show a multiuser diversity allocation scheme.

FIGS. 2A-2C show a multiuser frequency allocation scheme. FIGS. 2A-2C are graphs of signal-to-noise ratio (SNR) versus frequency. FIG. 2A shows SNR versus frequency for a first user of an OFDMA system. FIG. 2B shows SNR versus frequency for a second user of the OFDMA system. FIG. 2C shows FIGS. 2A & 2B overlapped, representing the complete multiuser diversity frequency allocation scheme for the first user and second user.

In FIG. 2A curve 205 is the SNR or channel gain experienced by a first user. In accordance with multiuser diversity frequency allocation this user has been assigned frequency bins that lie within coherence bandwidths that have high SNR. For example, bins 210, 211, 212 and all the other bins indicated with hatching sloping upward to the right are allocated to the first user.

In FIG. 2B curve 215 is the SNR or channel gain experienced by a second user. In accordance with multiuser diversity frequency allocation this user has been assigned frequency bins that lie within coherence bandwidths that have high SNR. For example, bins 220, 221, 222 and all the other bins indicated with hatching sloping upward to the left are allocated to the second user.

The overall multiuser diversity frequency allocation scheme is indicated in FIG. 2C which is a combination of FIGS. 2B & 2C. In FIG. 2C all the available frequency bins have been assigned to either the first or second user; and each user has been assigned bins that have high SNR for that particular user.

Multiuser diversity works best when channel state information, e.g. SNR versus frequency, is known at the transmitter. However, in practical systems channel state information at the transmitter is imperfect. Channel estimation error, feedback delay and limited feedback bandwidth all lead to imperfect information.

Imperfect channel state information at the transmitter can stem from several factors in practical wireless communications systems. In frequency division duplex (FDD) systems, channel state information is obtained at the transmitter side by measuring the channel in the forward link at the receiver and conveying the estimated channel state information to the transmitter via a feedback channel. In the presence of thermal noise and interference, the receiver is likely to estimate the channel only with limited accuracy, i.e. up to a certain estimation error.

Furthermore, the bandwidth of the feedback channel is limited in practical systems. This implies that the channel state information at the receiver is quantized before transmission via the feedback channel thus decreasing the accuracy of channel state information available at the transmitter. Also, the feedback channel is prone to errors which potentially further deteriorate the channel state information at the transmitter.

In mobile systems, due to delay and scheduling constraints on both the feedback channel and the forward link, there will be a mismatch between the channel state information at the transmitter and the actual channel conditions. Time division duplex (TDD) systems exploit the reciprocity of forward and backward propagation channels to obtain channel state information at the transmitter by measuring the channel conditions during the reverse link transmission. Factors that contribute to imperfect channel state information at the transmitter in TDD systems include channel estimation errors on the reverse link, delay and scheduling constraints.

When channel state information is poor or not available at all, many systems use frequency diversity mode. This mode is often used for high-mobility users. In this mode, users are allocated frequency bins in a pseudorandom fashion such that each user's allocation covers the entire OFDMA system bandwidth. The frequency diversity mode mitigates signal fading by using the frequency selectivity of the channel.

FIGS. 3A-3C show a frequency diversity allocation scheme. As in FIGS. 2A-2C, FIGS. 3A-3C are graphs of signal-to-noise ratio (SNR) versus frequency. FIG. 3A shows SNR versus frequency for a first user of an OFDMA system. FIG. 3B shows SNR versus frequency for a second user of the OFDMA system. FIG. 3C shows FIGS. 3A & 3B overlapped, representing the complete frequency diversity allocation scheme for the first user and second user.

In FIG. 3A curve 305 is the SNR or channel gain experienced by a first user. In accordance with frequency diversity allocation this user has been assigned frequency bins randomly across the entire OFDMA system bandwidth. For example, bins 310, 311, 312 and all the other bins indicated with hatching sloping upward to the right are allocated to the first user. Some of the bins are located in spectral regions with high SNR while others are in regions of low SNR.

In FIG. 3B curve 315 is the SNR or channel gain experienced by a second user. In accordance with frequency diversity allocation this user has been assigned frequency bins randomly across the entire OFDMA system bandwidth. For example, bins 320, 321, 322 and all the other bins indicated with hatching sloping upward to the left are allocated to the second user.

Figure 3:
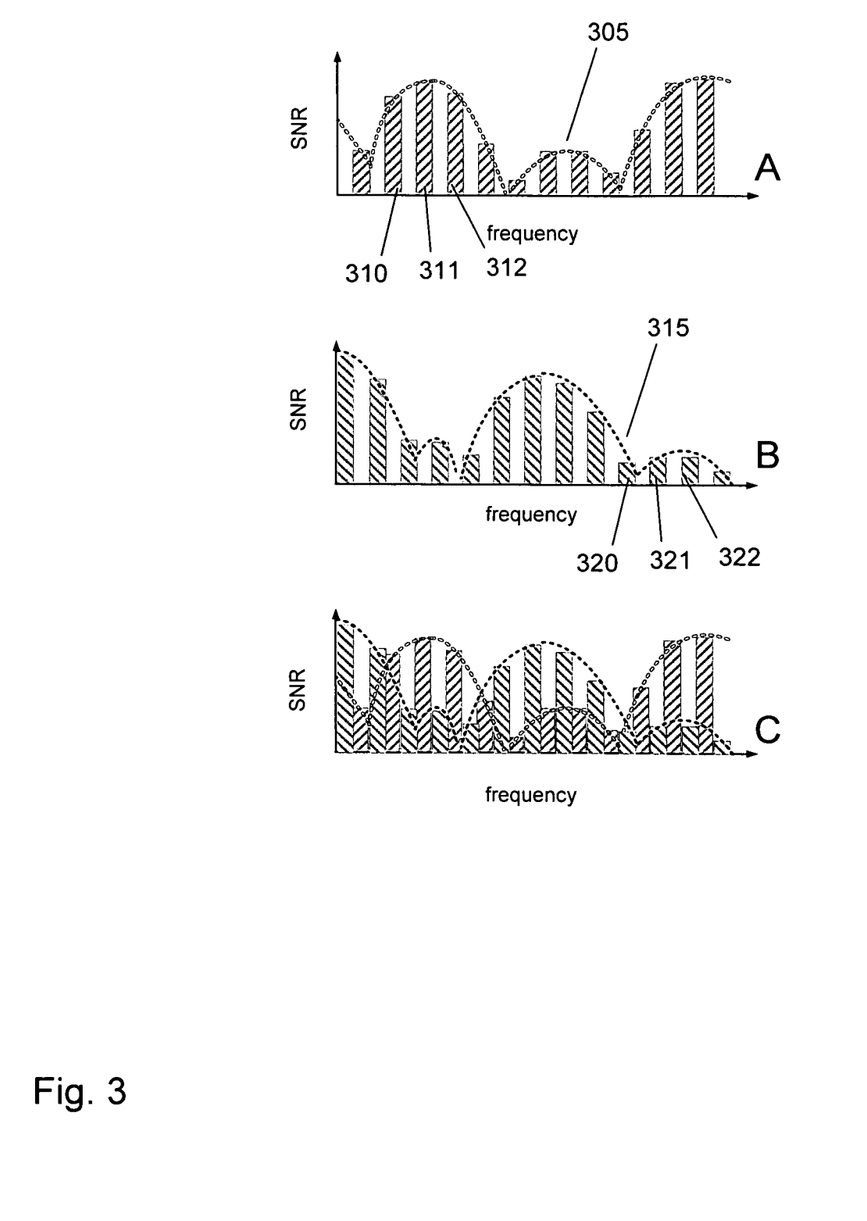
FIGS. 3A-3C show a frequency diversity allocation scheme.

The overall frequency diversity allocation scheme is indicated in FIG. 3C which is a combination of FIGS. 3B & 3C. In FIG. 3C all the available frequency bins have been assigned to either the first or second user. The allocation scheme is random without regard for channel state. Note that in FIG. 3 bins are assigned to the two users in a regular, alternating pattern for simplicity of illustration only. In an actual system the bin allocation in frequency diversity mode is pseudorandom with many users sharing the entire system bandwidth.

Current OFDMA systems commonly use frequency diversity allocation for applications involving mobile users because mobile users' channel gains are constantly changing. Put another way, when mobile users are involved, channel state information at the transmitter is of variable quality. Sometimes quite good channel state information is available and sometimes only poor channel state information may be obtained.

An improved frequency allocation scheme is obtained by combining the best features of frequency diversity and multiuser diversity. A better distribution of frequency-time resources (bins) can be achieved by creating a hybrid multiuser diversity-frequency diversity mode of operation for an OFDMA system. In this new mode, within each user's coherence bandwidth defining a pure multiuser diversity frequency allocation band, only a fraction of the coherence bandwidth is assigned to the user. The fraction of the multiuser coherence bandwidth reserved for the user is denoted by $\alpha$. In the remaining fraction, $1-\alpha$, of the coherence bandwidth, frequency bins are assigned randomly to users.

Figure 4:
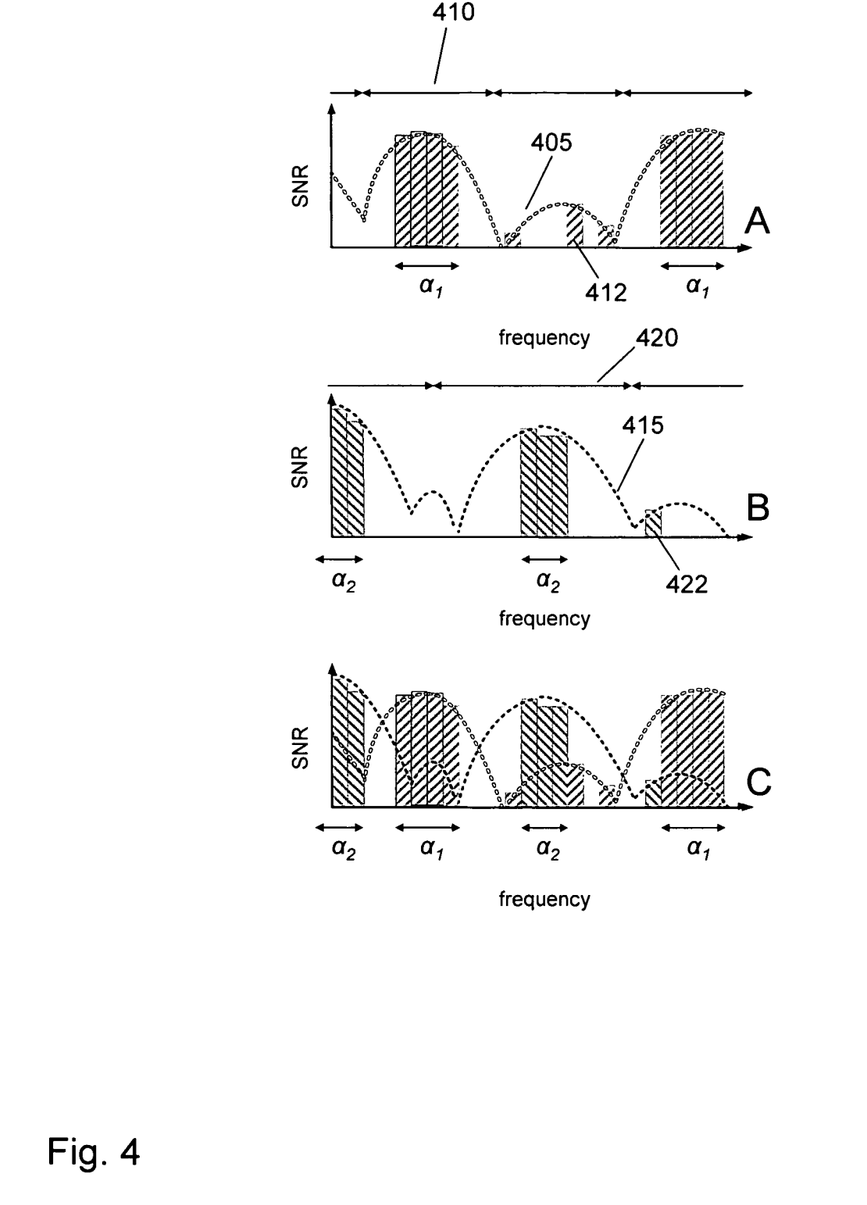
FIGS. 4A-4C show a hybrid multiuser diversity-frequency diversity allocation scheme.

FIGS. 4A-4C show a hybrid multiuser diversity-frequency diversity allocation scheme. As in FIGS. 2A-2C and FIGS. 3A-3C, FIGS. 4A-4C are graphs of signal-to-noise ratio (SNR) versus frequency. FIG. 4A shows SNR versus frequency for a first user of an OFDMA system. FIG. 4B shows SNR versus frequency for a second user of the OFDMA system. FIG. 4C shows FIGS. 4A & 4B overlapped, representing the hybrid multiuser diversity-frequency diversity allocation scheme for the first user and second user.

In FIG. 4A curve 405 is the SNR or channel gain experienced by a first user. Arrow 410 indicates approximately the extent of a coherence bandwidth with high SNR for the first user. Within coherence bandwidth 410 four frequency bins have been assigned to the first user and the combined bandwidth of these bins represents a fraction $\alpha_1$ of the coherence bandwidth. Some other frequency bins, e.g. bin 412, have been randomly assigned to the first user.

In FIG. 4B curve 415 is the SNR or channel gain experienced by a second user. Arrow 420 indicates the approximate extent of a coherence bandwidth with high SNR for the second user. Within coherence bandwidth 420 three frequency bins have been assigned to the second user and the combined bandwidth of these bins represents a fraction $\alpha_2$ of the coherence bandwidth. Some other frequency bins, e.g. bin 422, have been randomly assigned to the second user.

The overall hybrid multiuser diversity-frequency diversity allocation scheme is indicated in FIG. 4C which is a combination of FIGS. 4A & 4B. In FIG. 4C a fraction of available frequency bins within high SNR coherence bandwidths have been assigned to either the first or second user. The first user has been assigned a fraction $\alpha_1$ of its high SNR coherence bandwidth while the second user has been assigned a fraction $\alpha_2$ of its high SNR coherence bandwidth. The remaining portion of the bandwidth is available to be allocated to the first, second or other users on a pseudorandom basis.

In FIG. 4C frequency allocations are shown for only two users for simplicity. Bins allocated to the first user are marked with hatching upward sloping to the right, while those allocated to the second user are marked with hatching upward sloping to the left. Bins available to be allocated to other users are left blank.

The fraction, $\alpha$, of bins assigned to a user within its high SNR coherence bandwidths is a parameter of the system that depends on channel quality as determined from channel state information. As discussed herein channel state information may include: information about the instantaneous propagation channel, or information about the statistics of the propagation channel; e.g. the mean and variance of the propagation channel. Quality (equivalently: "channel quality") is the reliability, confidence level or ambiguity of channel state information. Channel quality may be mapped to $\alpha$ in several ways.

Consider the following model for channel state information at the transmitter:

$$h = \hat{h} + \sigma_e e \qquad \text{Eq. [1]}$$

In Eq. [1], h denotes the true channel state information, $\hat{h}$ is the knowledge of channel state information as available to the transmitter and $\sigma_e e$ is the error signal which represents the transmitter's ambiguity about the true channel state information. The $\sigma_e$ represents the variance of the channel state information and e is typically modeled as a Gaussian zero mean unit variance random signal. In Eq. [1], $\hat{h}$ typically represents the estimate of the instantaneous propagation channel.

In a hybrid multiuser diversity-frequency diversity allocation method, the choice of preferred coherence bandwidths for allocating sub-carriers may be made based on $\hat{h}$. Quality is determined from the variance, $\sigma_e$, of channel state information. $\sigma_e$ is mapped to $\alpha$ to determine the fraction of the coherence bandwidth to be allocated with sub-carriers. Small values for $\sigma_e$ represent low ambiguity about channel state information at the transmitter and therefore imply larger values for $\alpha$.

In the limiting case when $\sigma_e = 0$, $\alpha$ becomes 1 and therefore the hybrid method converges to multiuser diversity mode where preferred coherence bandwidths are fully allocated with sub-carriers. In the other extreme when $\sigma_e > \sigma_T$, where $\sigma_T$ is a suitable threshold, $\alpha$ becomes 0 and therefore method converges to frequency diversity mode where sub-carriers are allocated across the entire bandwidth without any preferred coherence bandwidth.

One way to map $\sigma_e$ to $\alpha$ is according to:

$$\alpha = \left\lceil \frac{\sigma_T - \sigma_e}{\sigma_T} \right\rceil^+ \qquad \text{Eq. [2]}$$

where $\lceil \alpha \rceil^+ = \alpha$, if $\alpha > 0$, and $\lceil \alpha \rceil^+ = 0$ if $\alpha \leq 0$.

Other mappings are also possible. $\sigma_e$ depends on the particular phenomenon which causes imperfect channel state information at the transmitter. For example, if the error signal comes from estimation of the instantaneous propagation channel, $\sigma_e$ may be determined from the mean square error for the particular channel estimation algorithm, obtained either analytically or empirically by calibration. On the other hand, if the error signal comes from delay and/or scheduling constraints, $\sigma_e$ may be determined from the decorrelation of the channel state in time as measured by a physical measurements block. For limited bandwidth feedback channels, $\sigma_e$ may be determined from the variance of the quantization noise.

The hybrid multiuser diversity-frequency diversity allocation scheme also applies to situations where channel state information at the transmitter is limited to knowledge of the statistics of the propagation channel; e.g. the mean and variance of the propagation channel. The model represented by Eq. [1] is still applicable with the modification that $\hat{h}$ and $\sigma_e$ now denote the mean and the variance of the propagation channel, respectively. Channel quality (which is determined from the variance of channel state information) is now determined from the variance, $\sigma_e$, of the propagation channel.

In this case, the choice of preferred coherence bandwidths for allocating sub-carriers is made based on the mean of the propagation channel. Channel quality is mapped to $\alpha$ to determine the fraction of the coherence bandwidth to be allocated with sub-carriers. The fraction, $\alpha$, is therefore a function of the variance of the propagation channel.

Figure 5:
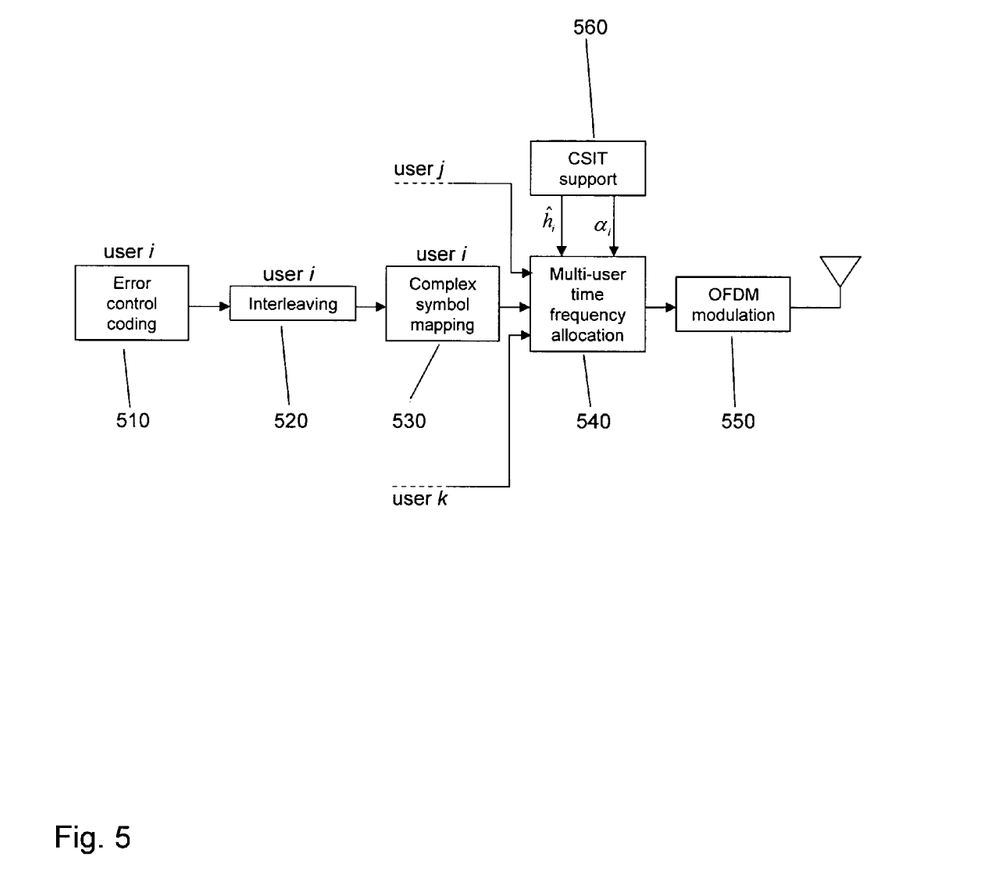
FIG. 5 shows a system block diagram for a transmitter incorporating channel state information.

FIG. 5 shows a system block diagram for a transmitter incorporating channel state information in a hybrid multiuser diversity-frequency diversity allocation scheme. In the figure, block 510 represents part of the system where data is encoded in an error control coding scheme. Error control coding prevents data loss even when symbols are dropped or received incorrectly at a receiver. Block 520, interleaving, is the part of the system in which encoded bits are interleaved so that complex symbols modulate non-consecutive bits from the encoded data stream. Complex symbol mapping, block 530, is the part of the system in which data is assigned to complex transmission symbols. The functions performed by blocks 510, 520 and 530 are performed for each of several users; e.g. users i, j and k. Block 540, multiuser time-frequency allocation is the part of the system that assigns complex transmission symbols from different users to time-frequency bins for wireless transmission. Channel state information at the transmitter (CSIT) support block 560, is the part of the system that supplies information about each user's (e.g. i's) estimated channel $\hat{h}_i$ and the fraction of bandwidth to use for multiuser allocation $\alpha_i$. The time-frequency allocation block 540 uses $\hat{h}_i$ and $\alpha_i$ to assign time-frequency bins in a hybrid scheme as described above and as illustrated in FIG. 4C. Finally, complex symbols which have been assigned to time-frequency bins modulate tones in OFDM modulation block 550.

Figure 6:
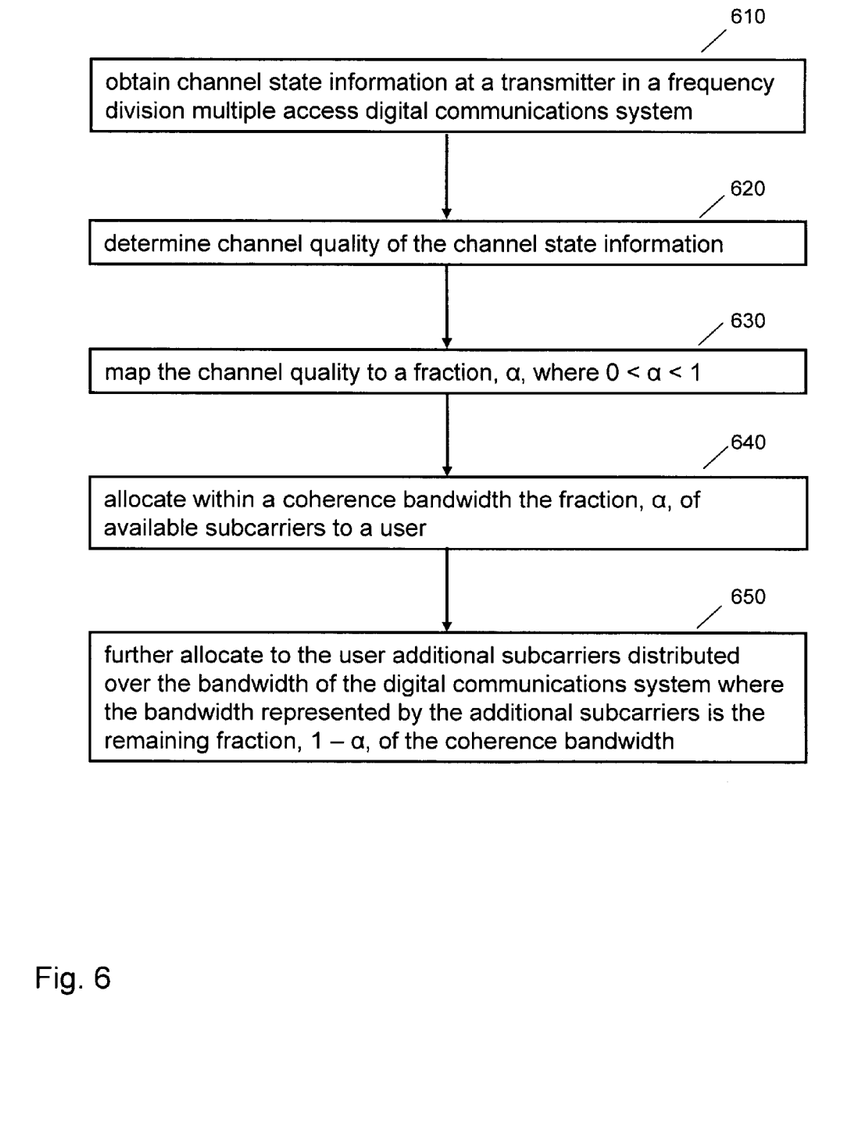
FIG. 6 shows a flow chart for implementing a hybrid multiuser diversity-frequency diversity allocation scheme.

FIG. 6 shows a flow chart for implementing a hybrid multiuser diversity-frequency diversity allocation scheme. The flow chart outlines major steps in a method for implementing hybrid multiuser diversity-frequency diversity allocation. In step 610 channel state information at a transmitter in a digital communications system is obtained. In step 620 channel quality is determined from the channel state information. In step 630 the channel quality is mapped to a fraction $\alpha$ where $0<\alpha<1$. In step 640 a fraction $\alpha$ of the available subcarriers within a coherence bandwidth are allocated to a user. In step 650 additional subcarriers are allocated to the user randomly over the bandwidth of the communications system. The combined bandwidth of these additional carriers represents the remaining fraction, $1-\alpha$, of the coherence bandwidth.

Overall a system and method are disclosed which combine the best features of multiuser diversity and frequency diversity allocation schemes in digital communications. The system and method retain the advantages of multiuser allocation whenever possible by assigning a fraction $\alpha$ of the available bandwidth to users in channels where the users are experiencing high SNR. Recognizing that channel state information at the transmitter is not perfect, however, the system and method allocate the remaining bandwidth, $1-\alpha$, pseudorandomly according to frequency diversity. The choice of a may be a function of: the quality of the estimate of the instantaneous propagation channel, or statistical parameters of a propagation channel, such as mean and variance of the propagation channel.

The communication systems and methods described above include a method for wireless data transmission comprising obtaining channel state information at a transmitter in a frequency division multiple access digital communications system. The method of an embodiment includes determining channel quality of the channel state information. The method of an embodiment includes mapping the channel quality to a fraction, $\alpha$, where $0<\alpha<1$. The method of an embodiment includes allocating within a coherence bandwidth the fraction, $\alpha$, of available subcarriers to a user. The method of an embodiment includes further allocating to the user additional subcarriers distributed over the bandwidth of the digital communications system. The bandwidth represented by the additional subcarriers of an embodiment is the remaining fraction, $1-\alpha$, of the coherence bandwidth.

The channel quality of an embodiment is determined from the variance of channel state information.

The variance of channel state information of an embodiment is determined from the mean square error of an estimate of the instantaneous propagation channel.

The variance of channel state information of an embodiment is determined from decorrelation of a channel state in time.

The variance of channel state information of an embodiment is determined from the variance of quantization noise in a limited bandwidth feedback channel.

The variance of channel state information of an embodiment is determined from the variance of the propagation channel.

The method for wireless data transmission of an embodiment comprises choosing the coherence bandwidth based on propagation channel statistics.

The propagation channel statistics of an embodiment comprise the mean of the propagation channel.

The communication systems and methods described above include a system for wireless data communication. The system of an embodiment comprises an error control coding unit. The system of an embodiment comprises an interleaving unit. The system of an embodiment comprises a complex-symbol mapper. The system of an embodiment comprises a multiuser time-frequency allocation unit operating with channel state information. The allocation unit of an embodiment allocates within a coherence bandwidth the fraction, $\alpha$, of available subcarriers to a user. The allocation unit of an embodiment further allocates to the user additional subcarriers distributed over the bandwidth of an OFDMA system. The bandwidth represented by the additional subcarriers of an embodiment is the remaining fraction, $1-\alpha$, of the coherence bandwidth.

The channel state information of an embodiment comprises the mean and the variance of the channel state information.

The fraction, $\alpha$, of an embodiment is a function of the variance of the channel state information.

As one skilled in the art will readily appreciate from the disclosure of the embodiments herein, processes, machines, manufacture, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, means, methods, or steps.

The above description of illustrated embodiments of the systems and methods is not intended to be exhaustive or to limit the systems and methods to the precise form disclosed. While specific embodiments of, and examples for, the systems and methods are described herein for illustrative purposes, various equivalent modifications are possible within the scope of the systems and methods, as those skilled in the relevant art will recognize. The teachings of the systems and methods provided herein can be applied to other systems and methods, not only for the systems and methods described above.

In general, in the following claims, the terms used should not be construed to limit the systems and methods to the specific embodiments disclosed in the specification and the claims, but should be construed to include all systems that operate under the claims. Accordingly, the systems and methods are not limited by the disclosure, but instead the scope of the systems and methods are to be determined entirely by the claims.

What is claimed is:

1. A method for performing a hybrid multiuser diversity-frequency diversity mode, the method comprising:
   obtaining an estimate of channel state information for a propagation channel used to transmit data to a wireless terminal;
   determining a confidence level that represents a potential for error between the estimate of the channel state information and true channel state information for the propagation channel;
   determining a preferred coherence bandwidth in a system bandwidth based on the estimate of the channel state information;
   mapping the confidence level to a fraction, $\alpha$;
   allocating a first number of subcarriers in the preferred coherence bandwidth to the wireless terminal, wherein the first number is based on the fraction; and
   pseudorandomly allocating a second number of subcarriers outside the preferred coherence bandwidth to the wireless terminal, wherein the second number is based on a fraction, $(1-\alpha)$.

2. The method of claim 1, wherein the confidence level is determined from the variance of the estimated channel state information.

3. The method of claim 2, wherein the variance of the estimated channel state information is determined from the mean square error of an estimate of the instantaneous propagation channel.

4. The method of claim 2, wherein the variance of the estimated channel state information is determined from decorrelation of a channel state in time.

5. The method of claim 2, wherein the variance of the estimated channel state information is determined from the variance of quantization noise in a limited bandwidth feedback channel.

6. The method of claim 2, wherein the variance of the estimated channel state information is determined from the variance of a propagation channel.

7. A system for performing a hybrid multiuser diversity-frequency diversity mode, the system comprising:
   a channel state information block configured to determine a confidence level that represents a potential for error between an estimate of channel state information for a propagation channel and true channel state information for the propagation channel, and to map the confidence level to a fraction, $\alpha$, wherein the propagation channel is used to transmit data to a wireless terminal; and
   a multi-user time-frequency allocation block configured to allocate a first number of subcarriers in a preferred coherence bandwidth to the wireless terminal, and to pseudorandomly allocate a second number of subcarriers outside the preferred coherence bandwidth to the wireless terminal, wherein the first number is based on the fraction, $\alpha$, and the second number is based on a fraction, $(1-\alpha)$.

8. The system of claim 7, wherein the channel state information block is configured to determine the confidence level from the variance of the estimated channel state information.

9. The system of claim 8, wherein the channel state information block is configured to determine the variance of the estimated channel state information from the mean square error of an estimate of the instantaneous propagation channel.

10. The system of claim 8, wherein the channel state information block is configured to determine the variance of the estimated channel state information from decorrelation of a channel state in time.

11. The system of claim 8, wherein the channel state information block is configured to determine the variance of the estimated channel state information from the variance of quantization noise in a limited bandwidth feedback channel.

12. The system of claim 8, wherein the channel state information block is configured to determine the variance of the estimated channel state information from the variance of a propagation channel.

13. The system of claim 7, wherein the preferred coherence bandwidth is determined based on the estimated channel state information.

14. A method for performing a hybrid multiuser diversity-frequency diversity mode, the method comprising:
   determining a confidence level that represents a potential for error between an estimate of channel state information for a propagation channel used to transmit data to a wireless terminal and true channel state information for the propagation channel;
   mapping the confidence level to a fraction, $\alpha$;
   allocating to the wireless terminal a first number of subcarriers in a preferred coherence bandwidth determined based on the estimate of the channel state information, wherein the first number is based on the fraction, $\alpha$; and
   pseudorandomly allocating a second number of subcarriers outside the preferred coherence bandwidth to the wireless terminal, wherein the second number is based on a fraction, $(1-\alpha)$.

15. The method of claim 14, wherein the confidence level is determined from the variance of the estimated channel state information.

16. The method of claim 15, wherein the variance of the estimated channel state information is determined from the mean square error of an estimate of the instantaneous propagation channel.

17. The method of claim 15, wherein the variance of the estimated channel state information is determined from decorrelation of a channel state in time.

18. The method of claim 15, wherein the variance of the estimated channel state information is determined from the variance of quantization noise in a limited bandwidth feedback channel.

19. The method of claim 15, wherein the variance of the estimated channel state information is determined from the variance of a propagation channel.

* * * * *